1 US011113730B1

(12) United States Patent
Birkett et al.

(10) Patent No.: US 11,113,730 B1
(45) Date of Patent: Sep. 7, 2021

(54) PARALLEL DATA POOL PROCESSING AND INTELLIGENT ITEM SELECTION

(71) Applicant: Amazon Technologies, Inc., Seattle, WA (US)

(72) Inventors: Andrew Douglas Birkett, Edinburgh (GB); Andrew J. Bradley, Edinburgh (GB); Anirudh Dastidar, West Midlands (GB); Anthony Richard McBryan, West Lothian (GB); Sebastiano Merlino, Edinburgh (GB); Fady Mohamed, Edinburgh (GB); Sean Daniel Murphy, Edinburgh (GB)

(73) Assignee: Amazon Technologies, Inc., Seattle, WA (US)

( * ) Notice: Subject to any disclaimer, the term of this patent is extended or adjusted under 35 U.S.C. 154(b) by 201 days.

(21) Appl. No.: 15/457,525

(22) Filed: Mar. 13, 2017

(51) Int. Cl.
*G06Q 30/02* (2012.01)
*G06N 5/04* (2006.01)

(52) U.S. Cl.
CPC .......... *G06Q 30/0275* (2013.01); *G06N 5/04* (2013.01)

(58) Field of Classification Search
None
See application file for complete search history.

(56) References Cited

U.S. PATENT DOCUMENTS

| 7,792,706 | B2 | 9/2010 | Tirumalareddy et al. |
| 7,991,757 | B2 | 8/2011 | Kane, Jr. |
| 8,010,407 | B1 | 8/2011 | Santoro et al. |
| 8,019,642 | B2 | 9/2011 | Sellinger et al. |
| 8,229,861 | B1 | 7/2012 | Trandal et al. |
| 9,407,975 | B2 | 8/2016 | Grusd |
| 9,672,554 | B2 | 6/2017 | Dumon et al. |
| 10,460,348 | B1 * | 10/2019 | Peddinti ............. G06Q 30/0277 |
| 10,825,064 | B1 | 11/2020 | Bradley et al. |
| 2001/0054008 | A1 | 12/2001 | Miller et al. |
| 2002/0161673 | A1 | 10/2002 | Lee et al. |
| 2005/0004880 | A1 | 1/2005 | Musgrove et al. |

(Continued)

OTHER PUBLICATIONS

Hella Kaffel—Ben Ayed, Fairness and Access Control for Mobile P2P Auctions over MANETs , p. 21, Jul. 2012 (Year: 2012).*

(Continued)

*Primary Examiner* — Abhishek Vyas
*Assistant Examiner* — Darnell A Pouncil
(74) *Attorney, Agent, or Firm* — Eversheds Sutherland (US) LLP

(57) ABSTRACT

Systems, methods, and computer-readable media are disclosed for parallel data pool processing and intelligent item selection. In one embodiment, an example method may include determining a first bid request comprising a first user identifier, determining a first set of product identifiers in a first user interaction history of the first user identifier, determining a second bid request comprising a second user identifier, and determining a second set of product identifiers in a second user interaction history of the second user identifier. Example methods may include determining estimated values for one or more product identifiers in the first set of product identifiers and the second set of product identifiers in parallel, and generating respective first and second responses to the first bid request and the second bid request using the estimated values.

20 Claims, 6 Drawing Sheets

(56) References Cited

U.S. PATENT DOCUMENTS

| | | | |
|---|---|---|---|
| 2005/0289039 A1* | 12/2005 | Greak | G06Q 30/0609 |
| | | | 705/37 |
| 2008/0103876 A1 | 5/2008 | Armstrong et al. | |
| 2008/0154765 A1 | 6/2008 | Wolfe | |
| 2008/0195475 A1 | 8/2008 | Lambert et al. | |
| 2009/0030786 A1 | 1/2009 | Rosler et al. | |
| 2011/0251875 A1 | 10/2011 | Cosman | |
| 2011/0264551 A1* | 10/2011 | Lau | G06Q 30/06 |
| | | | 705/26.3 |
| 2012/0036023 A1* | 2/2012 | Das | G06Q 30/02 |
| | | | 705/14.71 |
| 2012/0246003 A1 | 9/2012 | Hart et al. | |
| 2013/0325636 A1* | 12/2013 | Carter | G06Q 30/0277 |
| | | | 705/14.71 |
| 2014/0258032 A1* | 9/2014 | Psota | G06Q 30/0609 |
| | | | 705/26.35 |
| 2015/0206109 A1 | 7/2015 | Caldwell et al. | |
| 2017/0017971 A1 | 1/2017 | Moreau et al. | |
| 2017/0323380 A1 | 11/2017 | Alberti et al. | |
| 2020/0342066 A1 | 10/2020 | Lewis | |

OTHER PUBLICATIONS

Colleen Connolly-Ahem, Accounts, Media, and Culture: An International Impression Management Experiment (Year 2004): 20 pages.
Pepsi Cola—Soda Radio 1998, Ebay (Year: 2019); 2 pgs.
Pepsi is Launching an Android Phone in China, The Verge, Vox Media, LLC; (Year 2016); 4 pgs.
Pepsi Instant Camera, Ebay (2019); 2 pgs.
Puru Kulkarni, et al. "Importance-aware Bloom Filter for Set Membership Queries in Streaming Data", (2013); 10 pgs.

* cited by examiner

PARALLEL DATA POOL PROCESSING AND INTELLIGENT ITEM SELECTION

BACKGROUND

Content may be presented on electronic devices to users such that users can consume the content. Users may consume or interact with certain content while other content may not be consumed or interacted with. Content that is selected for presentation to users may be selected from multiple different pieces of content that could be from different sources and associated with different entities. Selection of content may occur in very short timespans, such as less than a second. Accordingly, selecting relevant content for presentation to users may be desirable.

Figure 1:
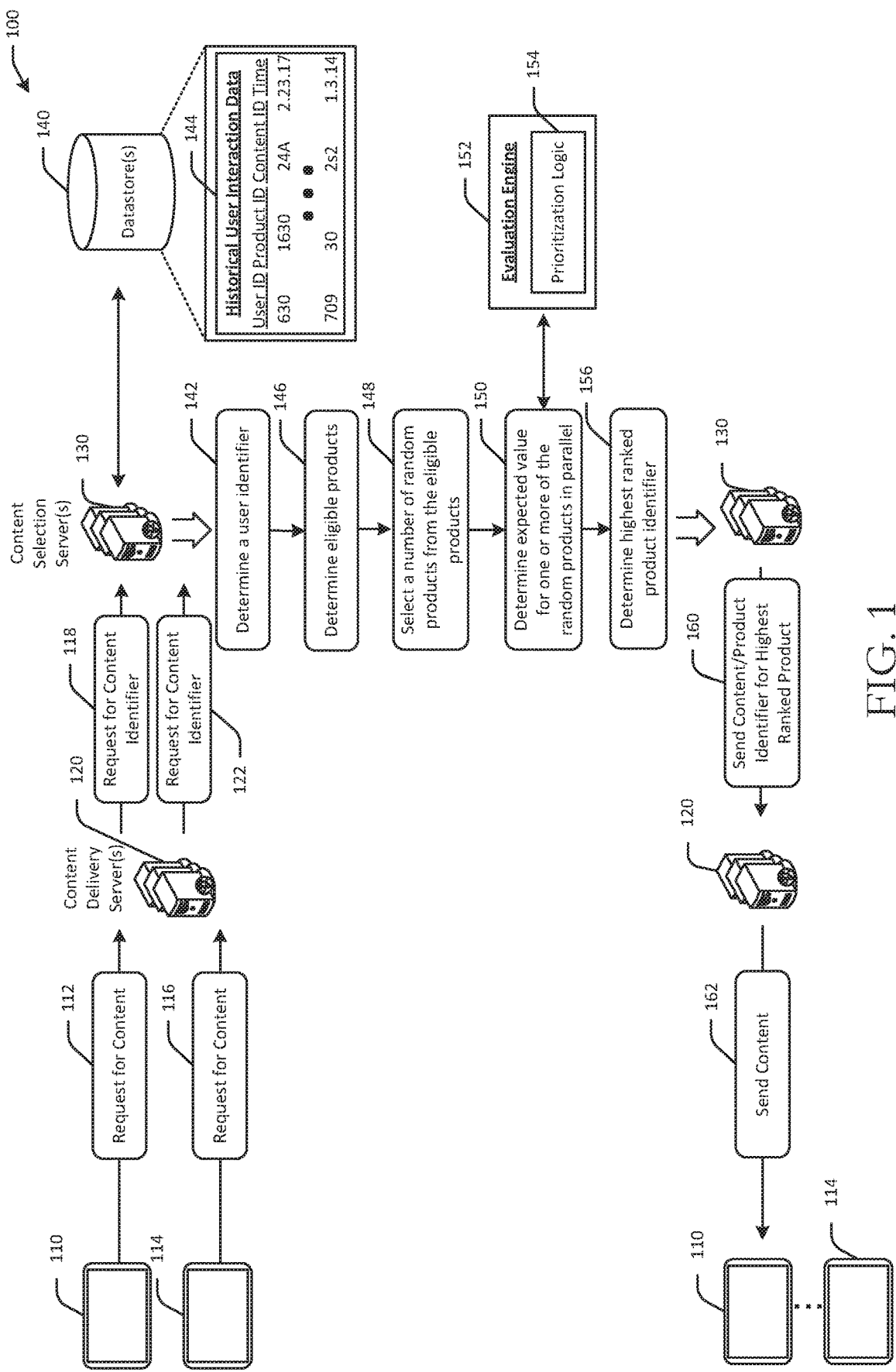
FIG. 1 is a hybrid system and process diagram illustrating parallel data pool processing and intelligent item selection in accordance with one or more embodiments of the disclosure.

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. The use of the same reference numerals indicates similar but not necessarily the same or identical components; different reference numerals may be used to identify similar components as well. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

DETAILED DESCRIPTION

Overview

Digital content may be presented at electronic devices, such that users of the electronic devices may consume the digital content. Content for delivery may include content such as text, images, videos, audio, and other content. Some content may include images of particular products, as well as additional product related information. Content may be targeted to specific users or groups of users. For example, targeting criteria for content that includes a product such as a smartphone may indicate that the content is to be presented to users in geographic locations where the smartphone may be available for purchase, as well as users that meet certain demographic, income, age or age range, and/or user preference criteria. Other targeting criteria may be used.

In some instances, a user may browse, in a digital environment, one or more products. For example, a user may look at a particular product while contemplating a purchase of the product. Certain user interactions with the product or with information associated with the product may indicate a level of interest and/or a user intent regarding the product. For example, if a user navigates to product reviews of the product, the user may be interested in purchasing the product. If the user spends several minutes at the product reviews, that may be an indication that the user read one or more of the product reviews and that the user is interested in purchasing the product. In another example, if the user adds the product to a digital shopping cart, or if the user searches for discount codes for the product, such user interactions may reflect a level of interest in the product. Therefore, presenting content to the user that is related to the product may result in the user making a purchase of the product. Some content may have or be associated with targeting criteria that includes users that have previously viewed or otherwise interacted with a product webpage, a product information page, or other product related data.

Selecting content for presentation to users may be performed during an auction process for a content delivery slot, or during other processes. In an auction process, content or product identifiers may be selected from many (e.g., 100 or more, etc.) potential or candidate content or product identifiers. In some instances, candidate product identifiers may be determined from a user interaction history or clickstream data for a user identifier of a user. Content selection may have to be performed in a limited time, such as less than about 40 milliseconds. Accordingly, selection of content from a set of multiple content and/or product identifiers in a relatively short time interval, where the content is relevant to a user, may result in increased or improved efficiency of content and/or content campaigns.

Embodiments of the disclosure may intelligently select content or product identifiers for presentation to certain users within restrictive time intervals, so as to increase an effectiveness of content that is presented to users, thereby increasing user engagement and/or interaction with content. Certain embodiments may select content or product identifiers from amongst tens of millions of pieces of content or product identifiers, and may have a limited amount of time to select content for presentation. Such embodiments may determine whether a user is eligible for certain content, and may use parallel processing of data or pools of data to evaluate several content and/or product identifiers in parallel, or simultaneously or at least partially simultaneously. In some instances, embodiments of the disclosure may receive a large number of bid requests, or requests to bid on available content delivery slots for certain users, at substantially the same time. To determine a bid amount for respective bid requests, and to select content or product identifiers for the respective bid requests, embodiments of the disclosure may use an evaluation engine that is configured to evaluate, at least partially, some or all of the content or product identifiers of a first bid request at the same time or concurrently with some or all of the content or product identifiers of a second bid requests. Evaluations may be determinations of expected values for the respective content or product identifier, or bid amounts for the respective content or product identifier. Contextual factors, such as time of day, user information, user spend information, geographic location, and the like may be considered in determining expected values. In this manner, some or all of the received bid requests will have at least one expected value for a content or product identifier associated with the bid request, so that the bid request will not go unanswered before a response is due or the bid request times out. For example, if a first bid request has 15 product identifiers that have to be evaluated, and a second bid request has 1 product identifier that has to be evaluated, but the second bid request was received after the first bid request and/or is queued behind the first bid request, embodiments of the disclosure may evaluate the 1 product identifier of the second bid request before evaluating all of the 15 product identifiers for the first bid request.

By using the evaluation engines, computing structures, and databases described herein, a determination and/or selection of content or product identifiers can be made within a relatively short timeframe (e.g., within about 30 milliseconds), regardless of the size or number of potential products or content from which the selection is to be made. In some embodiments, users may be grouped or linked together, and content or product identifiers that are selected for presentation to one of the users in a group may be extended across one or more, or all, of the users in the group.

This disclosure relates to, among other things, systems, methods, computer-readable media, techniques, and methodologies for parallel data pool processing and intelligent item selection. Embodiments may determine candidate content or product identifiers, deduplicate repeating identifiers of the candidate content or product identifiers, and determine expected values and/or bid amounts for product identifiers and/or bid requests in parallel. Certain embodiments may generate timers to track time out situations and/or for prioritizing processing or evaluation of at least one product identifier for a bid request.

Referring to FIG. 1, an example use case 100 illustrating parallel data pool processing and intelligent item selection is depicted in accordance with one or more embodiments of the disclosure. A user may be using a device 110 to access digital content. For example, the user may use the device 110 to access news, videos, images, articles, or other digital content. The device 110 may request content from one or more content delivery servers 120 over one or more wired or wireless networks. For example, the device 110 may be a smartphone and may request digital content from the content delivery server 120 over a WiFi or cellular network. Specifically, the device 110 may send a request for content at a first communication 112. The content delivery server 120 may receive the request for content from the device 110. The content that is requested by the device 110 may have one or more content delivery slots, or portions of the content at which a third party (e.g., in some instances a party other than a content publisher, etc.) may present content in addition to the requested content. For example, a video may be presented before or after presentation of the requested content, an image or certain content may be presented in line with the requested content, and the like. The content delivery server 120 may receive content requests from multiple user devices. For example, the content delivery server 120 may receive another request for content from a second device 114 at a second communication 116. The second communication 116 may be received at substantially the same time as the first communication 112 or shortly after.

At a third communication 118, the content delivery server 120 may request content and/or a content identifier from one or more content selection servers 130. The third communication 118 may be sent by the content delivery server 120 after receiving the first communication 112. At a fourth communication 122, the content delivery server 120 may request content and/or a content identifier from the content selection server 130 in response to the second communication 116.

The content selection server 130 may be one of a number of, or multiple, servers that receive the requests for the content identifiers from the content delivery server 120. The requests for the content identifiers from the content delivery server 120 may include a request for the content that was requested by the respective devices 110, 114 and/or a request for third-party or additional content. The third communication 118 and the fourth communication 122 may be bid requests, or requests for connected entities to bid on the opportunity to present content at a particular content delivery slot. The respective third communication 118 and the fourth communication 122 may include respective contextual information, such as a website of the content that was requested by the devices 110, 114, time and date information, etc., user information, such as a user identifier for the user that is operating or otherwise associated with the device, location information for the content delivery slot (e.g., for videos or audio content, a location could represent a playback position, such as before or after the requested content, etc.), and other information. Available content delivery slots may be locations on digital content at which content can be delivered, such as locations on a webpage, positions within a mobile app (e.g., banner slots, interstitial slots, popup slots, pop-under slots, etc.), or other suitable locations where digital content can be presented. The second communication 114 may also include user attributes for the user, geographic location information, time of day, contextual information for the content around the available content delivery slot, and other contextual information.

The content selection server 130 may be in communication with one or more datastores 140. The datastore 140 may include historical user interaction data 144 and other data. The historical user interaction data 144 may include user interaction data for one or more users over a period of time. For example, the historical user interaction data 144 may include clickstream data for one or more users. Clickstream data may include data related to user browse interactions, such as clicks, views, timings, and other information. The historical user interaction data 144 may include information related to user interactions such as purchases, clicks, views, hovers, likes, shares, comments, and other user interactions. For example, as illustrated in FIG. 1, the historical user interaction data 144 may include product identifier information for products that a particular user has interacted with. The product identifier information may be linked to or otherwise associated with a user identifier or a user profile of the user. Additional information, such as time of interaction, an elapsed time since interaction, etc. may be included in the historical user interaction data 144. The historical user interaction data 144 may include information for one or more, or all, users.

In the example of FIG. 1, the historical user interaction data 144 may include information for, among others, User ID 630, which may be a user identifier associated with the first device 110. The historical user interaction data 144 may include product identifiers and content identifiers that the user has interacted with, for example, during the last 30 days or for another period of time. The historical user interaction data 144 for the user may include a large number of interactions with product identifiers, for example. The historical user interaction data 144 for a particular user identifier may be indicative of products that the user is in-market for. Additional data, such as a propensity to spend and other metrics may also be determined for the user.

Using the third communication 118 as an example, after receiving the third communication 118, one or more computer processors at the content selection server 130 may execute certain operations. For example, at a first operation 142, the content selection server 130 may determine a user identifier for the first bid request. The content selection server 130 may determine the user identifier by extracting the user identifier from the bid request received from the content delivery server 120 at the third communication 118. Operations described with respect to data received at the third communication 118 may also be performed in response to the fourth communication 122.

At a second operation 146, the content selection server 130 may determine eligible products. The content selection server 130 may determine one or more eligible product identifiers, or in some instances content identifiers, that are eligible for presentation to the user identifier. In some instances, eligibility of product identifiers or content identifiers may be determined based at least in part on targeting criteria associated with the respective product identifiers or content identifiers. In other instances, eligibility of product identifiers or content identifiers may be determined based at least in part on the user's historical interactions. For example, if a user has interacted with a product identifier in the past, such as read product reviews associated with the product identifier, the user may be eligible for presentation of content associated with that product identifier, as long as the user has not already made a purchase of the product identifier. In some instances, purchase of a competing product may cause the user to be ineligible for certain product identifiers. The set of product identifiers in the historical user interaction data 144 may be optionally deduplicated so to remove duplicate product identifiers or product identifiers that appear more than once.

Eligible products may include an expansion on products that the user has interacted with. Some embodiments may use items or identifiers from a user's interaction history as seed identifiers, which can be used to determine similar and/or related product identifiers. Expanded products may include similar products (which may include competing products, different models or makes, etc.), related products (e.g., complementary products, accessories, products in similar product categories, etc.), products that are associated with promotional offers, and the like. A number of eligible products may be limited to, for example, 100 product identifiers. Time constraints may affect a number of eligible products that can be determined. In some embodiments, a determination may be made as to whether products in the user interaction history are eligible for presentation (e.g., approved as being inoffensive or appropriate, etc.).

At a third operation 148, the content selection server 130 may select a number of random products from the eligible products. For example, a total of 100 eligible product identifiers may be identified or determined. A random selection of a subset, such as 20 product identifiers, may be selected from the larger set of 100 eligible product identifiers. Other embodiments may include additional or fewer selections in the subset. Some embodiments may use logic to select the subset instead of randomly selecting the subset.

At a fourth operation 150, an expected value for one or more of the random subset of products may be determined in parallel. For example, expected values for the first bid request at the third communication 118 may be determined in parallel or at least partially in parallel with expected values for the second bid request at the fourth communication 122.

The expected values may be determined by an evaluation engine 152. The evaluation engine 152 may be stored and/or executed by one or more processors local to a host, such as the content selection server 130. The evaluation engine 152 may include prioritization logic 154. The prioritization logic 154 may be used by the evaluation engine 152 to determine an order or ranking of product identifiers and/or bid requests, so as to process at least a portion of multiple bid requests before completely processing some bid requests, which may reduce overall response times for the content selection server 130 and increase computing efficiency by improving management of available computing resources. The prioritization logic 154 may prevent bid requests from timing out without at least one expected value being determined for the bid request.

The evaluation engine 152 may determine estimated values for one or more product identifiers in the random subset in parallel with other product identifiers for other bid requests. For example, one component of the content selection server 130 may send a first evaluation request with the random subset to a model evaluator component, or the evaluation engine 152. The model evaluator component or evaluation engine 152 may be configured to determine an order of priority for estimated value determinations for bid requests using the prioritization logic 154. The order of priority may be based at least in part on a remaining time for responding to a bid request, a number of expected values already calculated for a bid request, and other factors.

At a fifth operation 156, a highest ranked product identifier may be determined. For example, the product identifiers for the first bid request may be ranked using the respective expected values. Some embodiments may adjust expected values by allowables or modifiers to account for an amount of profit that will be generated from a sale of a product, etc. The content selection server 130 may rank the product identifiers based at least in part on the expected values and a highest ranked product identifier may be determined. Other factors may include an expected cost of presenting content related to a particular product identifier, an expected revenue for presenting content related to a particular product identifier, a probability that the user will interact with content that includes or is related to the product identifier, and other factors.

The content selection server 130 may select the highest ranked product identifier from the first set of estimated values (received from or determined by the evaluation engine 152) using the respective estimated values. In some embodiments, the highest ranked product identifier and/or selected product identifier may be associated with a promotional offer, which may be used in responding to the first bid request.

In some embodiments, rankings of eligible product identifiers may be based at least in part on a ranking score, such as a probability of conversion or a probability of action for specific users. Probability of conversion or probability of action may be the probability that serving one impression to the user will lead to a conversion or a click or other desired action. Probabilities may be determined, for example, by logistic regressions, redundancy models, or other models. The models used to determine probability may consider several inputs, including user-specific information (e.g., demographic, purchase history, etc.), context information (e.g., time of day, website content, keywords, etc.), etc. In some embodiments, the content selection server 130 may pre-rank eligible product for users, so as to reduce computations at runtime.

At a fifth communication 160, the content selection server 130 may send a content identifier for the selected content (e.g., the highest-ranked product identifier), or a product identifier for a selected product identifier, to the content delivery server 120. In some instances, the content selection server 130 may also send a bid amount for presentation of an impression of the content at the content delivery slot. The fifth communication 160 may be in response to the third communication 118. The content selection server 130 may determine a response to the second bid request or the fourth communication 122 at the same time as determining the response to the first bid request. The content selection server 130 may generate respective responses to the first bid request and the second bid request using the estimated values.

The content delivery server 120 may receive the content identifier from the content selection server 130, and may send the content and/or the content identifier to the device 110 at a sixth communication 162. In some instances, the content delivery server 120 may conduct a second price auction to determine which content to send to the device 110.

The content may be presented at a display or via speakers of the device 110. In some embodiments, the device 110 may be configured to present audio, such as music, news, weather information, or other audible content to a user. Available content slots may allow for presentation of audio content in between segments of audio presented at the device 110. For example, the user may be streaming music or other audio, and at pauses or breaks in between the music, audio content may be presented. The device 110 may be configured to present audible content and may be, for example, a device such as a television, a laptop computer, a tablet, a computer monitor, a speaker-type device, augmented reality or virtual reality glasses or devices, or another device configured to output audio. The device 110 may include or may utilize a speech interface device or other audio device, such as one or more speakers, that are capable of playing or presenting various types of audio. The device 110 may include one or more microphones to detect ambient sound. The device 110 may operate in conjunction with and/or under the control of a remote network-based speech command service that is configured to receive audio; to recognize speech in the audio; and to perform functions or services in response to the recognized speech, or to generate audible dialog or audible content in response to recognized speech. The device 110 may have one or more microphones and one or more audio speakers or transducers to facilitate speech interactions with the user. The device 110 may receive spoken expressions or utterances from the user and may provide services, perform actions, or facilitate conversation or dialogue in response to the spoken utterances. For example, the user may speak an utterance with a verbal request. In some embodiments, the device 110 may only be activated to listen upon determining that the user has spoken a predefined wake or trigger expression (e.g., "Awake" or "Alexa," etc.), that may be followed by an utterance (e.g., "I'd like to order a taxi."). Provided services may include performing actions or activities, rendering media, obtaining and/or providing information, providing information via generated or synthesized speech via the device 110, initiating Internet-based services on behalf of the user, performing actions relating to home automation and control, and so forth.

The systems, methods, computer-readable media, techniques, and methodologies for parallel data pool processing and intelligent item selection may result in optimal and/or improved selection of content or product identifiers for presentation to specific users. In some embodiments, parallel processing of one or more data sets may be achieved, in conjunction with respective timers that may be managed by a computing device.

Example embodiments of the disclosure provide a number of technical features or technical effects. For example, in accordance with example embodiments of the disclosure, certain embodiments of the disclosure may identify product identifiers, determine a subset of the product identifiers, and evaluate sets of product identifiers in parallel. As a result, content or product identifiers from catalogs or databases of tens of millions of products can be selected in a relatively short time frame, due to increased computing efficiency and improved use of computer resources. The above examples of technical features and/or technical effects of example embodiments of the disclosure are merely illustrative and not exhaustive.

One or more illustrative embodiments of the disclosure have been described above. The above-described embodiments are merely illustrative of the scope of this disclosure and are not intended to be limiting in any way. Accordingly, variations, modifications, and equivalents of embodiments disclosed herein are also within the scope of this disclosure. The above-described embodiments and additional and/or alternative embodiments of the disclosure will be described in detail hereinafter through reference to the accompanying drawings.

Illustrative Processes and Use Cases

Figure 2:
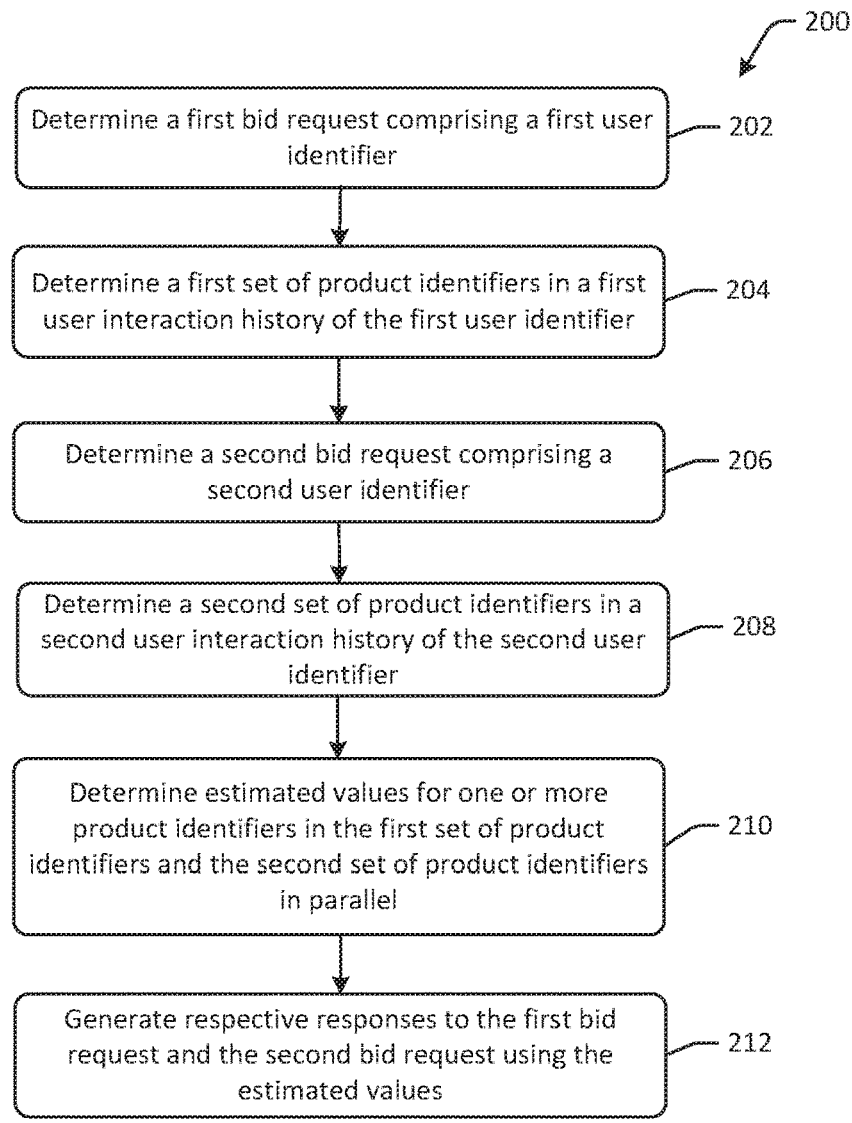
FIG. 2 is an example process flow diagram for parallel data pool processing and intelligent item selection in accordance with one or more embodiments of the disclosure.

Referring to FIG. 2, an example process flow 200 for parallel data pool processing and intelligent item selection in accordance with one or more embodiments of the disclosure is depicted. The process flow 200 may be used, in some embodiments, by one or more content selections servers to select content for presentation to a particular user. Content selected as a result of execution of some or all of the operations of the process flow 300 may have an increased likelihood of engaging the user, an increased relevance to a particular user, and/or an increased likelihood of user interaction with the content. Content may include a product identifier that is presented as part of, or otherwise associated with, the content. Although certain operations are illustrated as occurring separately in FIG. 2, some or all of the operations may occur concurrently or partially concurrently across one or more computer systems. One or more operations may be optional in FIG. 2.

At block 202 of the process flow 200, a first bid request comprising a first user identifier may be determined. For example, a bid request may be received at a content selection server from, for example, a content delivery server. The bid request may be for a content delivery slot, and may include a first user identifier for a first user, contextual information, timing information, and/or other information. In one embodiment, computer-executable instructions of one or more content selection module(s) stored at a server may be executed to determine a bid request and parse the bid request to extract information from the bid request.

At block 204 of the process flow 200, a first set of product identifiers in a first user interaction history of the first user identifier may be determined. For example, a user interaction history for the first user may be determined in response to the first bid request. The user interaction history may indicate, in one example, that the user purchased a particular product. In one embodiment, computer-executable instructions of one or more content selection module(s) stored at a server may be executed to ingest, receive, and/or determine clickstream data for a particular user, such as the first user. The clickstream data may be parsed or analyzed, and user interaction data may be extracted. A user account of the user may be determined using, for example, a user identifier. Based at least in part on the clickstream data or other historical data, a set of purchased items may be determined for the user account. The set of purchased items may include the first product identifier, which may be for a first item purchased during a first predetermined time interval. The predetermined time interval may be for a preceding amount of time, such as the last 30 days, for an entirety of a user account's existence, or for another predetermined time interval.

At block 206 of the process flow 200, a second bid request comprising a second user identifier may be determined. The second bid request may also be received by the content selection server. The second bid request may be received at the same time or at substantially the same time as the first bid request.

At block 208 of the process flow 200, a second set of product identifiers in a second user interaction history of the second user identifier may be determined. In one embodiment, computer-executable instructions of one or more content selection module(s) stored at a server may be executed to ingest, receive, and/or determine clickstream data for the second user identifier. In one example, it may be determined that the second user interacted with one product identifier.

At block 210 of the process flow 200, estimated values for one or more product identifiers in the first set of product identifiers and the second set of product identifiers may be determined in parallel. For example, computer-executable instructions of one or more evaluation module(s) stored at a server may be executed to determine a first set of estimated values for one or more product identifiers in the first set of product identifiers, and determine a second set of estimated values for one or more product identifiers in the second set of product identifiers in parallel with the first set of estimated values. For example, based at least in part on a remaining amount of time for responding to the respective bid requests, alternating product identifiers may be evaluated for the first and second sets, such that for every product identifier that is evaluated for the first bid request, a subsequent product identifier is evaluated for the second bid request, rather than evaluating all of the product identifiers for the first or second bid requests before moving to the other bid request. In one embodiment, one estimated value for a product identifier in the first set of product identifiers may be determined before two estimated values for two product identifiers in the second set of product identifiers are determined. In another example, at least one estimated value for a product identifier in the first set of product identifiers may be determined before two estimated values for two product identifiers in the second set of product identifiers are determined. In some embodiments, product identifiers of a particular bid request may be evaluated in parallel. In such embodiments, product identifiers of different bid requests may also be evaluated in parallel.

At block 212 of the process flow 200, respective responses to the first bid request and the second bid request may be generated using the estimated values. For example, computer-executable instructions of one or more content selection module(s) stored at a server may be executed to determine respective highest ranking product identifiers and associated expected values or bid amounts, and generate respective responses to the first bid request and the second bid request.

Figure 3:
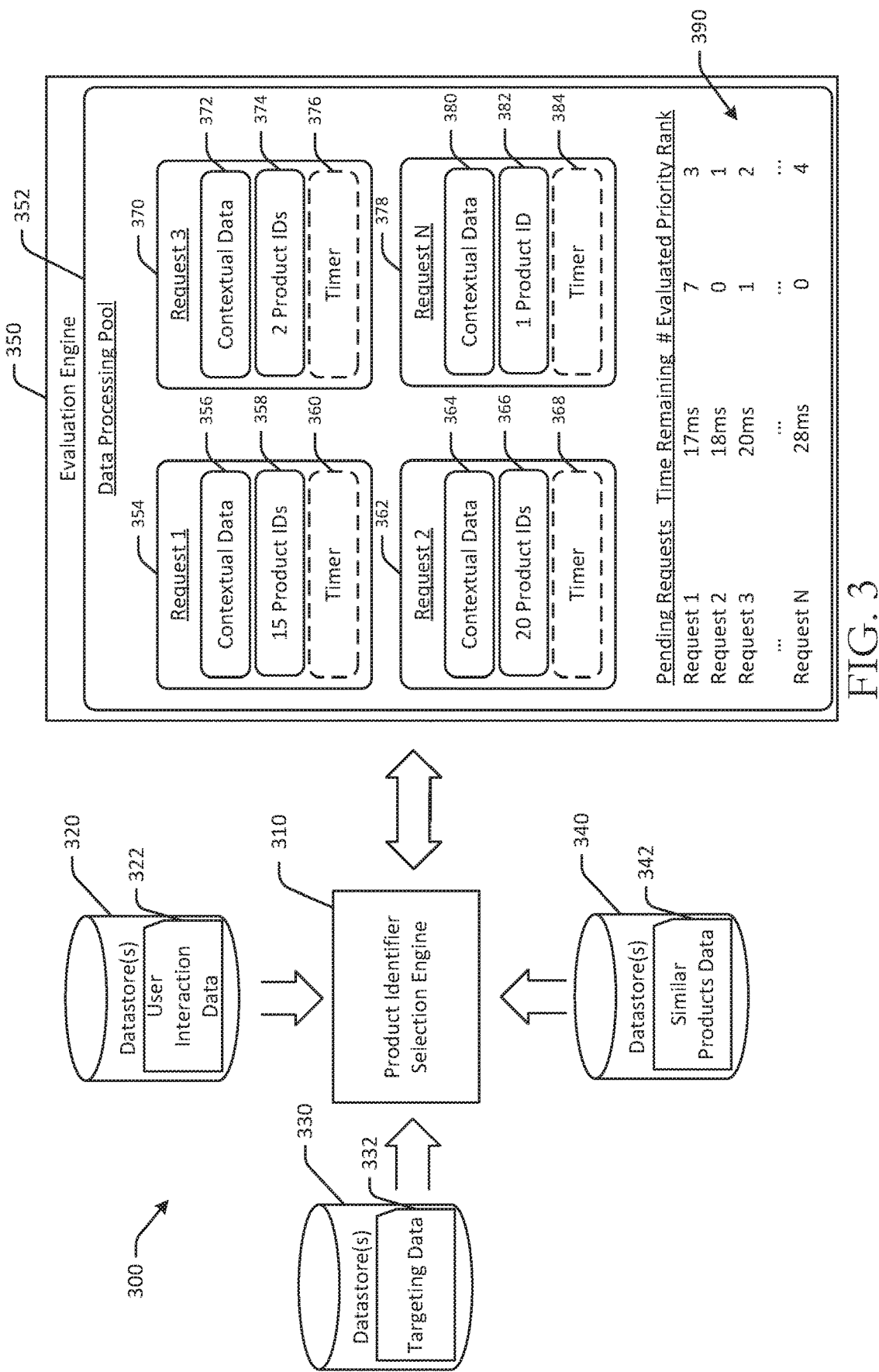
FIG. 3 is a hybrid system and process diagram for parallel data pool processing and intelligent item selection in accordance with one or more embodiments of the disclosure.

FIG. 3 depicts an example hybrid system and process flow diagram 300 for parallel data pool processing and intelligent item selection in accordance with one or more embodiments of the disclosure. In FIG. 3, a product identifier selection engine 310 may include computer-executable instructions to determine product identifier selections for specific users. The product identifier selection engine 310 may be stored at a user device or at one or more remote servers. The product identifier selection engine 310 may be configured to select content and/or product identifiers for presentation to specific users. One or more inputs may be received by or sent to the product identifier selection engine 310. For example, in FIG. 3, the product identifier selection engine 310 may be in communication with a datastore(s) 320. The datastore(s) 320 may include user interaction data 322. The product identifier selection engine 310 may determine user interaction data for a particular user using the datastore(s) 320. The datastore(s) 320 may include databases representing user interaction data for one or more users. In some embodiments, the datastore(s) 320 may include dislike event data or other data related to specific user preferences with respect to previously presented content and/or product identifiers. Content associated with a dislike event may be blocked from selection for presentation for the user and/or for users that are related to the user (e.g., household users, etc.). The datastore(s) 320 may be stored or cached locally or remotely.

The product identifier selection engine 310 may be in communication with one or more datastore(s) 330 that include targeting data 332. The targeting data 332 may include information related to targeting criteria for one or more content and/or product identifiers that are available for presentation to users. The datastore(s) 330 may include available content identifiers for content or product identifiers that are available for presentation or for selection for presentation. In some instances, the datastore(s) 330 may include data related to eligible content for certain users. In such instances, eligibility determinations may be completed before a bid request is received or may otherwise be prefetched. The datastore(s) 330 may include product information such as parent product identifiers for available products, model numbers, pricing information, rating information, product family identifiers, inventory level information, and other product related information. The product identifier selection engine 310 may access the datastore(s) 330 to determine eligible products for a user, in one example. The datastore(s) 330 may be stored or cached locally or remotely.

The product identifier selection engine 310 may be in communication with one or more datastore(s) 340 that include similar products data 342. The datastore(s) 340 may be stored or cached locally or remotely. The datastore(s) 340 may include one or more product identifiers, browse node data, product similarity data, and other information that may be used by the product identifier selection engine 310 to determine similar or related products. For example, parent product identifiers for particular products may be determined, product distances in a vector and/or two-dimensional space may be determined and used to determine product similarity, product manufacturers may be determined, and the like. The product identifier selection engine 310 may access the datastore(s) 340 to determine products that are related to a selected product or a product that may be selected for presentation. For example, the product identifier selection engine 310 may determine parent, child, or sibling products by analyzing a browse node or other hierarchy of products.

Using some or all of the information determined and/or received from the datastore(s) 320, the datastore(s) 330, and/or the datastore(s) 340, the product identifier selection engine 310 may generate a set of one or more product or content identifiers that may be suitable for presentation to a specific user.

For example, the product identifier selection engine 310 may be in communication with an evaluation engine 350. The evaluation engine 350 may be stored and/or executed at the same host as the product identifier selection engine 310. The product identifier selection engine 310 may send one or more evaluation requests to the evaluation engine 350. The evaluation requests may be specific to bid requests and may include any number of product identifiers for evaluation. Evaluation may include determining an expected value of presenting an impression associated with a particular product identifier, generating bid amounts, and the like. The evaluation engine 350 may evaluate the requests and may send a response to the product identifier selection engine 310. The product identifier selection engine 310 may select a product identifier using the data in the response from the evaluation engine 350, which may be used to respond to a bid request.

In the example of FIG. 3, the evaluation engine 350 may include a data processing pool 352. The data processing pool 352 may include bid requests and/or evaluation requests that are waiting to be processed or evaluated by the evaluation engine 350. For example, a first evaluation request 354 may include contextual data 356, a set of product identifiers 358, and an optional timer 360. The contextual data 356 may include relevant contextual information extracted from a bid request, such as user identifier data, time of day information, and the like. The set of product identifiers 358 may include any number of product identifiers that are eligible for selection for presentation to the specific user identifier for which the request is pending. For example, there may be 15 product identifiers for evaluation for the first evaluation request 354 because the user may be eligible for 15 different product identifiers. The 15 product identifiers may be randomly selected from a number of other product identifiers in the user's interaction history data. The set of product identifiers may include a set of product identifiers that are related to one or more of seed product identifiers or other related product identifiers to product identifiers appearing in a user's clickstream data. The timer 360 may be a timer that is generated by the product identifier selection engine 310 for a time in which a response to the first evaluation request 354 is needed, or may be generated by the evaluation engine 350 indicative of a time at which the first evaluation request 354 was received. The evaluation request and/or the bid request may time out at the end of the timer. In one example, a content selection server may determine an allotted time for responding to the first bid request or an allotted time for responding to an evaluation request and may generate a timer, where the first timer is for a length of time that is less than or equal to the allotted time. Timers may be accessible by the evaluation engine 350 or model evaluator component. In the event that a timer is expired or is expiring, the evaluation engine 350 may determine that estimated values have been partially determined for an evaluation request and may send the determined estimated values, while canceling determination of unevaluated product identifiers.

Accordingly, the evaluation engine 350 may be configured to evaluate at least one product identifier for an evaluation request before the evaluation request times out and/or before the timer for an evaluation request reaches 0 or otherwise indicates no time remaining. A second evaluation request 362 may be sent to the evaluation engine 350 and may include respective contextual data 364, 20 product identifiers in a set of product identifiers 366, and an optional timer 368. Each evaluation request may have its own timer or timestamp that can be used to determine a remaining amount of time before a bid request response and/or an evaluation request response is due. A third evaluation request 370 may be received by the evaluation engine 350 from another server and may include contextual data 372, 2 product identifiers in a set of product identifiers 374, and an optional timer 376. A fourth evaluation request N 378 may be received by the evaluation engine 350 from another server in the fleet and may include contextual data 380, 1 product identifier in a set of product identifiers 382 and a timer 384.

The evaluation engine 350 may use prioritization logic 390 to process the evaluation requests in parallel and to determine an order of processing. For example, in FIG. 3, a priority rank, or an order of processing, may indicate that at least one product identifier from Request 2 is to be processed first. This may be because there have not yet been any product identifiers evaluated for Request 2. Request 3 may be ranked second, such that at least one product identifier from Request 3 is to be processed second, which could be due to the fact that only 1 product identifier from Request 3 has been evaluated. Request 1 could be ranked third, although 7 product identifiers have already been evaluated, because Request 1 has 15 total product identifiers, with 8 unevaluated requests. While Request N has 0 product identifiers evaluated, Request N may be ranked fourth because of the length of time remaining (e.g., 28 ms is greater than the remaining time for the other requests, etc.), and/or because there is only 1 product identifier to be evaluated for Request N. Any suitable prioritization logic may be applied by the evaluation engine 350 to facilitate processing the evaluation requests in parallel.

In one example, the evaluation engine 350 may determine that a timer value is at or below a threshold length of time, and may prioritize the associated evaluation request ahead of other requests. The evaluation engine 350 may pause determination of estimated values for the other evaluation requests or bid requests while determining estimated values for the prioritized request. The evaluation engine 350 may be used for all bid requests, or during certain times, such as at a peak bid request processing time. In some embodiments, the evaluation engine 350 or model evaluator component may be configured to prioritize evaluation of product identifiers that are associated with promotional offers. Promotional offer information may be associated with the product identifier information in the evaluation request.

In another example, the evaluation engine 350 may prioritize evaluation requests or product identifiers of respective evaluation requests based at least in part on a number of product identifiers associated with the respective evaluation requests. For example, the evaluation engine 350 may determining that a first total number of product identifiers for the first evaluation request 354 is greater than a second total number of product identifiers for the third evaluation request 370. The evaluation engine 350 may determine a first estimated value for a first product identifier of the first evaluation request 354 and may determine that a remaining amount of time on the second timer 376 is less than a threshold value. The evaluation engine 350 may pause evaluation of the first evaluation request 354 and may determine a second estimated value for the one or more product identifiers of the third evaluation request 370. The evaluation engine may then determine a second estimated value for a second product identifier of the first evaluation request 354. In some embodiments, an estimation or selection of product identifiers may be made, for example, in the event that insufficient time remains to evaluate an expected value. Estimations or selections may be based at least in part on simple metrics or features of a product identifier, such as a cost of the product, whether the product is new, a product that has the highest conversion rate, the most expensive product, and the like. Such determinations may be made instead of expected value calculations in some embodiments.

Figure 4:
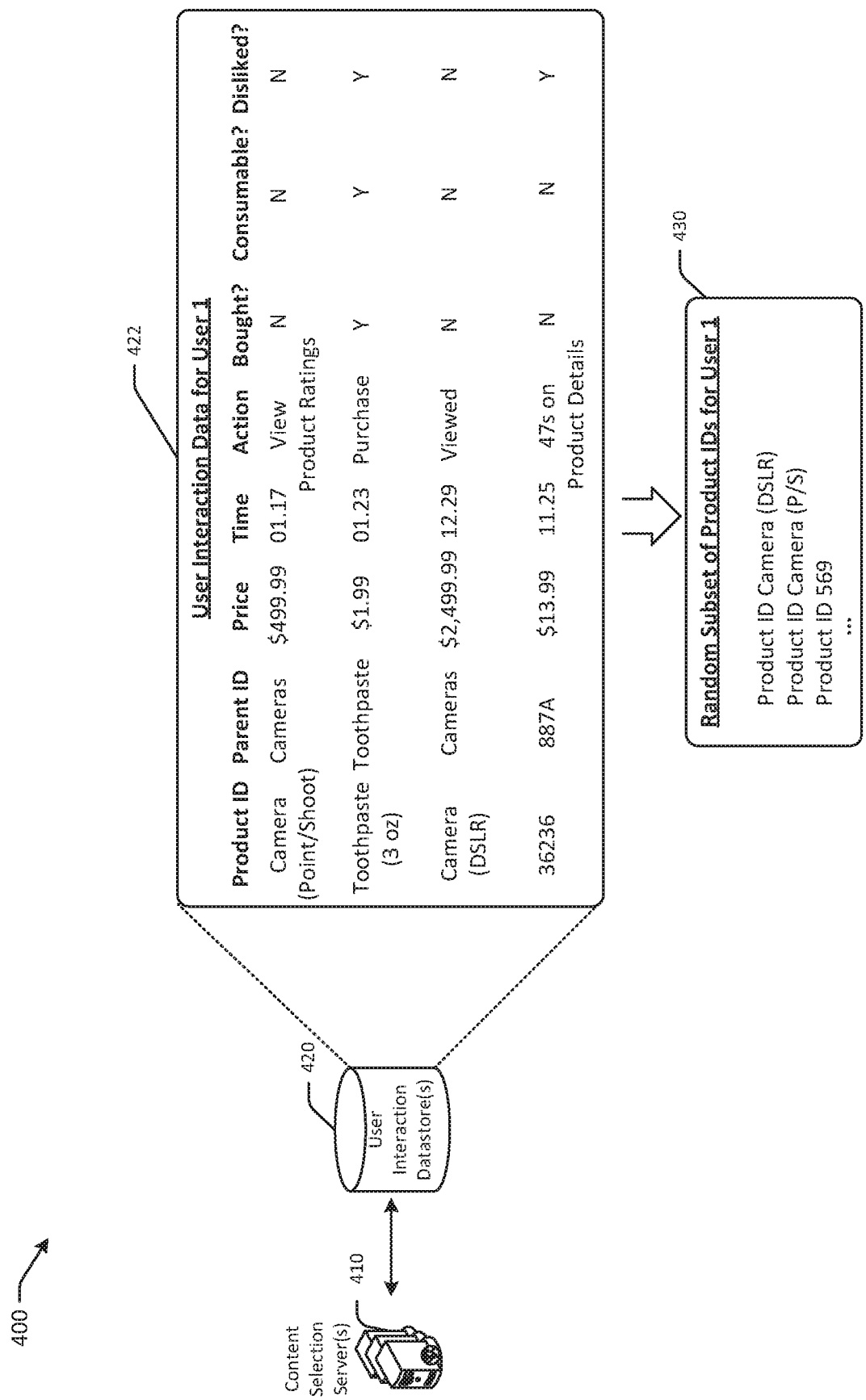
FIG. 4 is a schematic drawing of an example datastore with user interaction data in accordance with one or more embodiments of the disclosure.

FIG. 4 depicts an example system 400 with one or more content selection servers 410 in communication with one or more user interaction datastore(s) 420 in accordance with one or more embodiments of the disclosure. The user interaction datastore(s) 420 may include user interaction data linked to respective user identifiers. For example, first user interaction data 422 may be for a first user identifier, such as "User 1." The first user interaction data 422 may include product identifier data for products that the user has interacted with. For example, the user may have interacted with products such as a point and shoot camera, 3 oz. toothpaste, a DSLR camera, and another product identifier "36236." For one or more, or each, of the product identifiers, a parent product identifier may be determined and/or stored at the user interaction datastore(s) 420. For example, the point and shoot camera may be associated with a parent product identifier of "cameras," the 3 oz. toothpaste may be associated with a parent product identifier of "toothpaste," the DSLR camera may be associated with a parent product identifier of "cameras," and the product identifier "36236" may be associated with a parent product identifier of "887A." Price information for one or more, or each, of the product identifiers may be determined and/or stored at the user interaction datastore(s) 420, as well as a time of the user interaction. Action data, or interaction event data, may be determined for respective product identifiers. As shown in FIG. 4, example action events may include viewing product ratings, purchase events, a time spent consuming product details, and other actions. Information related to whether the product identifier is associated with a purchase event may be available (e.g., in one example, a binary "Yes" or "No" data entry may be available, etc.), as well as an indication of whether the product identifier is a consumable product. If the product identifier is a consumable product, then the product identifier may be eligible for presentation to the user after a time period that may correspond to the consumption period for the product identifier. Consumable products may be linked to a reset time for the consumable product, which may be an expected length of time for consumption of the consumable. Purchases of consumable products may be automatically deleted or ignored until the reset time is complete. Additional information, such as dislike event or trashed content information may be included. Other user interaction data may include additional or fewer, or different, data for particular users.

Clickstream data may be processed so as to avoid counting user interactions with products that occur during a grace period, such as shortly before or after (e.g., 1 hour, etc.) a purchase event of a product. For example, a user may buy a product and then return to the product page for information. Such an event may be ignored or treated as neutral data in the clickstream data because it may not be indicative of a user's intent to purchase.

The user interaction datastore(s) 420 may include, or data from the user interaction datastore(s) 420 may be processed to determine, random subset data 430 for one or more users. The random subset data 420 may include a random subset of product identifiers for users that are selected from the product identifiers that the user has interacted with. The random subset may include any number of product identifiers. For example, the random subset may include a maximum of 20 product identifiers or another number of product identifiers. The content selection server 410 may determine a first subset of a first set of product identifiers in the user interaction data 422. The first subset may be randomly selected, or may be determined based on a frequency of occurrence or other metric.

Figure 5:
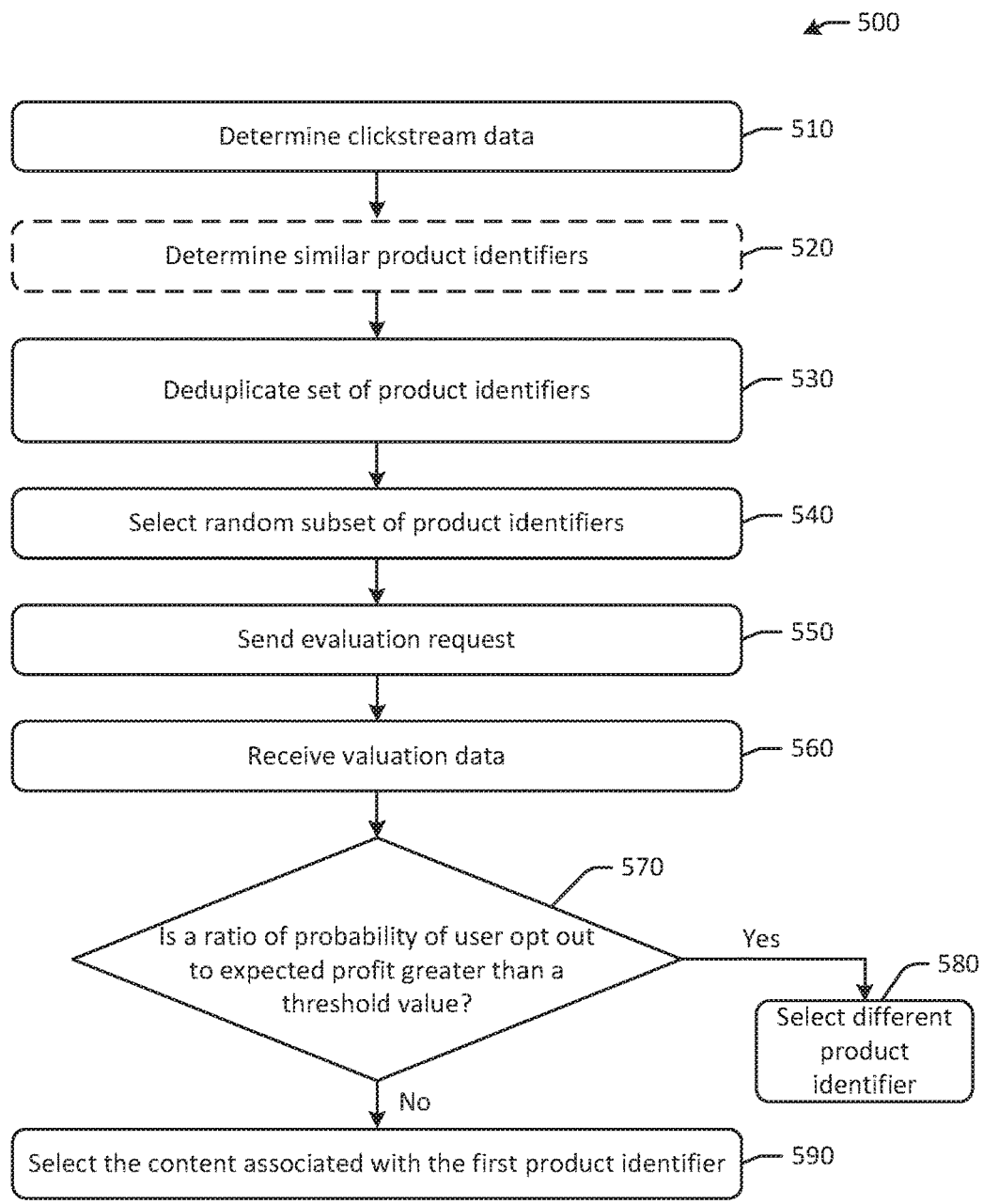
FIG. 5 is an example process flow diagram for selecting content based at least in part on a threshold difference in one or more values in accordance with one or more embodiments of the disclosure.

FIG. 5 is an example process flow 500 for selecting content based at least in part on a threshold difference in one or more values in accordance with one or more embodiments of the disclosure. FIG. 5 may be used to determine whether a user has purchased or invalidated a product identifier.

At block 510, a portion of clickstream data for a user may be determined. The portion of the clickstream data may be for a certain time interval or an entirety of the user's available clickstream data (e.g., the last 24 hours, etc.). One or more product identifiers may be determined using at least a portion of the clickstream data. The one or more product identifiers may be product identifiers that the user account has purchased, or for which a purchase event is associated with. In one embodiment, a set of product identifiers of purchased items that a user has purchased may be determined using the user account. The set of purchased items may include, for example, a first product identifier for a first item purchased during a first predetermined time interval, such as during the last 12 months.

At optional block 520, similar product identifiers may be determined. The similar products may be products that are similar to the product identifiers that are present in the user's clickstream data.

At block 530, the set of product identifiers, which may include the similar product identifiers, may be deduplicated, so as to remove product identifiers that appear more than once in the set.

At block 540, a random subset of product identifiers may be selected. For example, a specific number of product identifiers may be selected from the set of deduplicated product identifiers.

At block 550, an evaluation request may be sent, for example, to a model evaluator component for evaluation of the random subset. The model evaluator component may evaluate one or more, or all, of the product identifiers in parallel with other requests. The model evaluator component may be executed at a local host.

At block 560, valuation data may be received from the model evaluator component. The valuation data may include determinations of expected value for one or more respective product identifiers in the random subset.

At determination block 570, it may be determined whether a ratio of a probability of the user opting out of content presentation as a result of being presented the product identifier to an expected profit value for a potential sale of the selected product identifier is greater than a threshold value. For example, a profit value may be determined indicative of an amount of profit that may be generated if a sale of the product were to occur as a result of presentation of the content with the product identifier. The profit value may be a dollar value, in one example, and may be the sale price minus the cost of the product. The probability of user opt out may be a probability value indicative of a chance or likelihood that the user will opt out of being presented content if the user is presented with the particular product identifier. For example, the user may not like the product identifier and may opt out as a result. The ratio may be the profit value divided by the probability value. The resulting value may be compared to a threshold value to determine whether the outcome of determination block 570 is positive or negative. In some embodiments, the profit value or an expected profit may be used to determine or modify bid values for responses to bid requests. Similarly, contribution profit values (e.g., how much profit did content generate for an entity, etc.) may be determined and/or used to modify bid amounts.

If it is determined at determination block 570 that the ratio is greater than the threshold value, the process flow 500 may proceed to block 580, at which a different product identifier or a fallback image is presented or selected for presentation. The expected value of presenting the product identifier may be insufficient in view of a risk the user will opt out of content presentation.

If it is determined at determination block 560 that the ratio is less than the threshold value, the process flow 500 may proceed to block 590, at which content that is associated with the first product identifier may be selected for presentation. Certain embodiments may include determinations as to whether bidding objectives, such as order product sales (e.g., how much user spends after showing them content, etc.), contribution profit (e.g., how much profit did content generate for an entity, etc.), and the like for the process flow 500.

Content or product identifiers that are determined to be eligible for a particular user may be propagated as eligible for users that are related to the user, such as household members or other related users. Related users may be determined, in one example, by identifying user accounts with the same shipping address, linked online membership logins, etc. Similarly, content that is determined to be ineligible for a user may be propagated across related users. For example, if a user has purchased a television, it may be unlikely that another user in the same household will purchase a television. Accordingly, some or all of the household or related users may be prevented from being presented content or product identifiers related to televisions.

One or more operations of the method, process flows, or use cases of FIGS. 1-5 may have been described above as being performed by a user device, or more specifically, by one or more program module(s), applications, or the like executing on a device. It should be appreciated, however, that any of the operations of methods, process flows, or use cases of FIGS. 1-5 may be performed, at least in part, in a distributed manner by one or more other devices, or more specifically, by one or more program module(s), applications, or the like executing on such devices. In addition, it should be appreciated that processing performed in response to execution of computer-executable instructions provided as part of an application, program module, or the like may be interchangeably described herein as being performed by the application or the program module itself or by a device on which the application, program module, or the like is executing. While the operations of the methods, process flows, or use cases of FIGS. 1-5 may be described in the context of the illustrative devices, it should be appreciated that such operations may be implemented in connection with numerous other device configurations.

The operations described and depicted in the illustrative methods, process flows, and use cases of FIGS. 1-5 may be carried out or performed in any suitable order, such as the depicted orders, as desired in various example embodiments of the disclosure. Additionally, in certain example embodiments, at least a portion of the operations may be carried out in parallel. Furthermore, in certain example embodiments, less, more, or different operations than those depicted in FIGS. 1-5 may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Illustrative Computer Architecture

Figure 6:
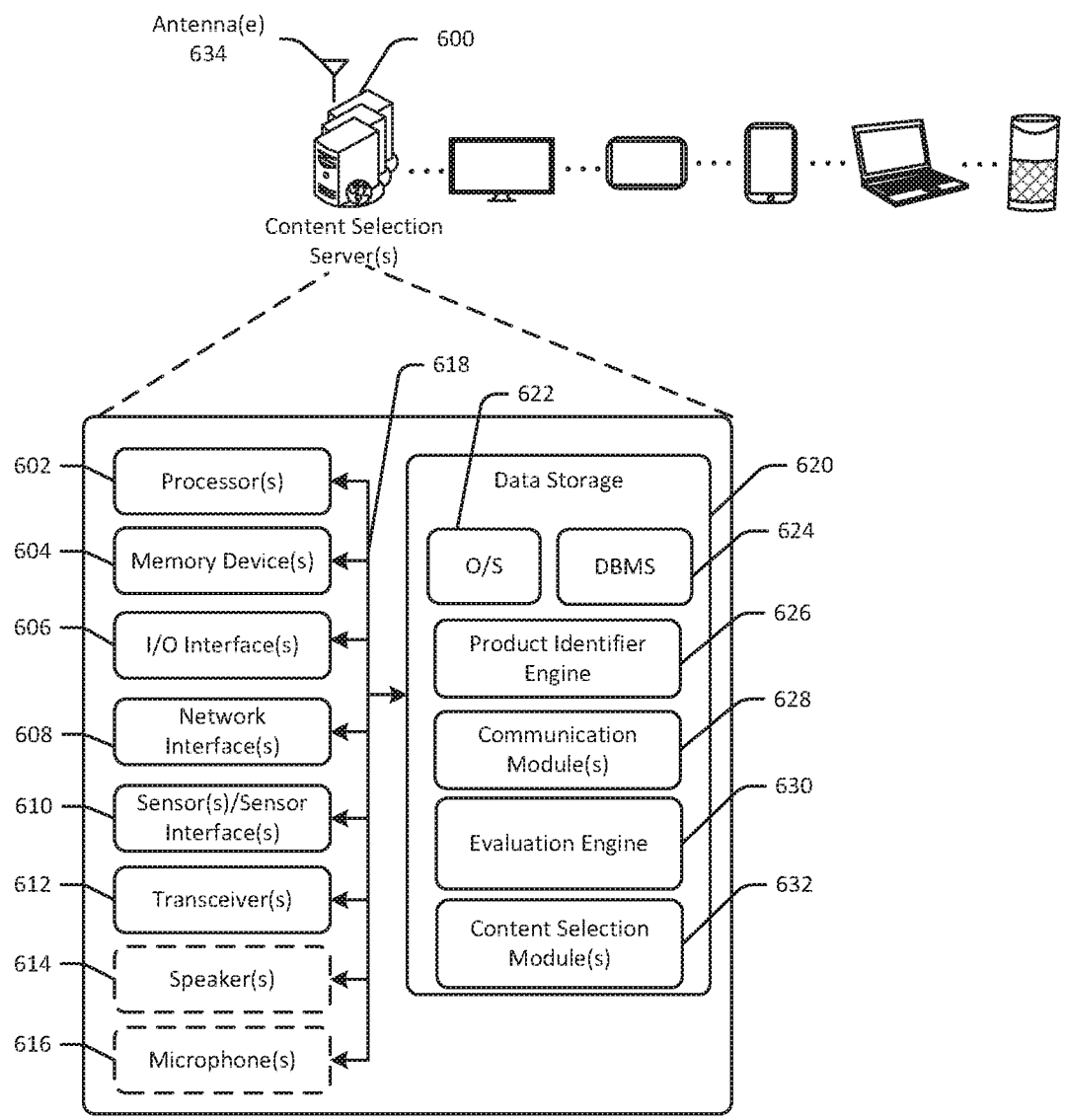
FIG. 6 schematically illustrates an example architecture of a content selection server in accordance with one or more embodiments of the disclosure.

FIG. 6 is a schematic block diagram of one or more illustrative content selection server(s) 600 in accordance with one or more example embodiments of the disclosure. The content selection server(s) 600 may include any suitable computing device including, but not limited to, a server system, a mobile device such as a smartphone, tablet, e-reader, wearable device, or the like; a desktop computer; a laptop computer; a content streaming device; a set-top box; or the like. The content selection server(s) 600 may correspond to an illustrative device configuration for the content selection servers or content delivery servers of FIGS. 1-5.

The content selection server(s) 600 may be configured to communicate via one or more networks with one or more servers, user devices, or the like. The content selection server(s) 600 may be configured to determine eligible content, determine user purchase or interaction data, interact with or perform auction bidding operations, selection of content or product identifiers, prioritize processing of bid requests and/or valuations of product or content identifiers, and other operations. The content selection server(s) 600 may be configured to deliver or cause delivery of one or more pieces of content and may further be configured to engage in a bidding process for auctions to present content. In some embodiments, a single remote server or single group of remote servers may be configured to perform more than one type of content delivery functionality.

The content selection server(s) 600 may be configured to communicate via one or more networks. Such network(s) may include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. Further, such network(s) may have any suitable communication range associated therewith and may include, for example, global networks (e.g., the Internet), metropolitan area networks (MANs), wide area networks (WANs), local area networks (LANs), or personal area networks (PANs). In addition, such network(s) may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

In an illustrative configuration, the content selection server(s) 600 may include one or more processors (processor(s)) 602, one or more memory devices 604 (generically referred to herein as memory 604), one or more input/output ("I/O") interfaces 606, one or more network interfaces 608, one or more sensors or sensor interfaces 610, one or more transceivers 612, one or more optional speakers 614, one or more optional microphones 616, and data storage 620. The content selection server(s) 600 may further include one or more buses 618 that functionally couple various components of the content selection server(s) 600. The content selection server(s) 600 may further include one or more antenna(e) 634 that may include, without limitation, a cellular antenna for transmitting or receiving signals to/from a cellular network infrastructure, an antenna for transmitting or receiving Wi-Fi signals to/from an access point (AP), a Global Navigation Satellite System (GNSS) antenna for receiving GNSS signals from a GNSS satellite, a Bluetooth antenna for transmitting or receiving Bluetooth signals, a Near Field Communication (NFC) antenna for transmitting or receiving NFC signals, and so forth. These various components will be described in more detail hereinafter.

The bus(es) 618 may include at least one of a system bus, a memory bus, an address bus, or a message bus, and may permit exchange of information (e.g., data (including computer-executable code), signaling, etc.) between various components of the content selection server(s) 600. The bus(es) 618 may include, without limitation, a memory bus or a memory controller, a peripheral bus, an accelerated graphics port, and so forth. The bus(es) 618 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnects (PCI) architecture, a PCI-Express architecture, a Personal Computer Memory Card International Association (PCMCIA) architecture, a Universal Serial Bus (USB) architecture, and so forth.

The memory 604 of the content selection server(s) 600 may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. Persistent data storage, as that term is used herein, may include non-volatile memory. In certain example embodiments, volatile memory may enable faster read/write access than non-volatile memory. However, in certain other example embodiments, certain types of non-volatile memory (e.g., FRAM) may enable faster read/write access than certain types of volatile memory.

In various implementations, the memory 604 may include multiple different types of memory such as various types of static random access memory (SRAM), various types of dynamic random access memory (DRAM), various types of unalterable ROM, and/or writeable variants of ROM such as electrically erasable programmable read-only memory (EEPROM), flash memory, and so forth. The memory 604 may include main memory as well as various forms of cache memory such as instruction cache(s), data cache(s), translation lookaside buffer(s) (TLBs), and so forth. Further, cache memory such as a data cache may be a multi-level cache organized as a hierarchy of one or more cache levels (L1, L2, etc.).

The data storage 620 may include removable storage and/or non-removable storage including, but not limited to, magnetic storage, optical disk storage, and/or tape storage. The data storage 620 may provide non-volatile storage of computer-executable instructions and other data. The memory 604 and the data storage 620, removable and/or non-removable, are examples of computer-readable storage media (CRSM) as that term is used herein.

The data storage 620 may store computer-executable code, instructions, or the like that may be loadable into the memory 604 and executable by the processor(s) 602 to cause the processor(s) 602 to perform or initiate various operations. The data storage 620 may additionally store data that may be copied to memory 604 for use by the processor(s) 602 during the execution of the computer-executable instructions. Moreover, output data generated as a result of execution of the computer-executable instructions by the processor(s) 602 may be stored initially in memory 604, and may ultimately be copied to data storage 620 for non-volatile storage.

More specifically, the data storage 620 may store one or more operating systems (O/S) 622; one or more database management systems (DBMS) 624; and one or more program module(s), applications, engines, computer-executable code, scripts, or the like such as, for example, one or more product identifier engine(s) 626, one or more communication module(s) 628, one or more evaluation engine(s) 630, and/or one or more content selection module(s) 632. Some or all of these module(s) may be sub-module(s). Any of the components depicted as being stored in data storage 620 may include any combination of software, firmware, and/or hardware. The software and/or firmware may include computer-executable code, instructions, or the like that may be loaded into the memory 604 for execution by one or more of the processor(s) 602. Any of the components depicted as being stored in data storage 620 may support functionality described in reference to correspondingly named components earlier in this disclosure.

The data storage 620 may further store various types of data utilized by components of the content selection server(s) 600. Any data stored in the data storage 620 may be loaded into the memory 604 for use by the processor(s) 602 in executing computer-executable code. In addition, any data depicted as being stored in the data storage 620 may potentially be stored in one or more datastore(s) and may be accessed via the DBMS 624 and loaded in the memory 604 for use by the processor(s) 602 in executing computer-executable code. The datastore(s) may include, but are not limited to, databases (e.g., relational, object-oriented, etc.), file systems, flat files, distributed datastores in which data is stored on more than one node of a computer network, peer-to-peer network datastores, or the like. In FIG. 6, an example datastore(s) may include, for example, historical data for campaigns, inventory data, campaign performance data, and/or other information.

The processor(s) 602 may be configured to access the memory 604 and execute computer-executable instructions loaded therein. For example, the processor(s) 602 may be configured to execute computer-executable instructions of the various program module(s), applications, engines, or the like of the content selection server(s) 600 to cause or facilitate various operations to be performed in accordance with one or more embodiments of the disclosure. The processor(s) 602 may include any suitable processing unit capable of accepting data as input, processing the input data in accordance with stored computer-executable instructions, and generating output data. The processor(s) 602 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 602 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 602 may be capable of supporting any of a variety of instruction sets.

Referring now to functionality supported by the various program module(s) depicted in FIG. 6, the product identifier engine(s) 626 may include computer-executable instructions, code, or the like that responsive to execution by one or more of the processor(s) 602 may perform functions including, but not limited to, retrieving, ingesting, receiving, or determining clickstream data and other user data, determining product identifiers, determining similar product identifiers, determining similar product identifiers, determining promotional offers associated with product identifiers, and the like.

The communication module(s) 628 may include computer-executable instructions, code, or the like that responsive to execution by one or more of the processor(s) 602 may perform functions including, but not limited to, communicating with remote servers, communicating with remote datastores, sending or receiving notifications, communicating with cache memory data, and the like.

The evaluation engine(s) 630 may include computer-executable instructions, code, or the like that responsive to execution by one or more of the processor(s) 602 may perform functions including, but not limited to, determining bid amounts for respective product identifiers, determining rankings for product identifiers, determining a probability of whether a bid amount was a winning bid amount, determining whether to select certain content or a certain product identifier, and the like.

The content selection module(s) 632 may include computer-executable instructions, code, or the like that responsive to execution by one or more of the processor(s) 602 may perform functions including, but not limited to, determining base bid values, determining bid modifiers, determining viewability constraint statuses, determining eligibility for certain content or product identifiers for specific users, determining whether content or a product identifier has been previously presented to a user or a user device, and the like.

Referring now to other illustrative components depicted as being stored in the data storage 620, the O/S 622 may be loaded from the data storage 620 into the memory 604 and may provide an interface between other application software executing on the content selection server(s) 600 and hardware resources of the content selection server(s) 600. More specifically, the O/S 622 may include a set of computer-executable instructions for managing hardware resources of the content selection server(s) 600 and for providing common services to other application programs (e.g., managing memory allocation among various application programs). In certain example embodiments, the O/S 622 may control execution of the other program module(s) to dynamically enhance characters for content rendering. The O/S 622 may include any operating system now known or which may be developed in the future including, but not limited to, any server operating system, any mainframe operating system, or any other proprietary or non-proprietary operating system.

The DBMS 624 may be loaded into the memory 604 and may support functionality for accessing, retrieving, storing, and/or manipulating data stored in the memory 604 and/or data stored in the data storage 620. The DBMS 624 may use any of a variety of database models (e.g., relational model, object model, etc.) and may support any of a variety of query languages. The DBMS 624 may access data represented in one or more data schemas and stored in any suitable data repository including, but not limited to, databases (e.g., relational, object-oriented, etc.), file systems, flat files, distributed datastores in which data is stored on more than one node of a computer network, peer-to-peer network datastores, or the like. In those example embodiments in which the content selection server(s) 600 is a mobile device, the DBMS 624 may be any suitable light-weight DBMS optimized for performance on a mobile device.

Referring now to other illustrative components of the content selection server(s) 600, the input/output (I/O) interface(s) 606 may facilitate the receipt of input information by the content selection server(s) 600 from one or more I/O devices as well as the output of information from the content selection server(s) 600 to the one or more I/O devices. The I/O devices may include any of a variety of components such as a display or display screen having a touch surface or touchscreen; an audio output device for producing sound, such as a speaker; an audio capture device, such as a microphone; an image and/or video capture device, such as a camera; a haptic unit; and so forth. Any of these components may be integrated into the content selection server(s) 600 or may be separate. The I/O devices may further include, for example, any number of peripheral devices such as data storage devices, printing devices, and so forth.

The I/O interface(s) 606 may also include an interface for an external peripheral device connection such as universal serial bus (USB), FireWire, Thunderbolt, Ethernet port or other connection protocol that may connect to one or more networks. The I/O interface(s) 606 may also include a connection to one or more of the antenna(e) 634 to connect to one or more networks via a wireless local area network (WLAN) (such as Wi-Fi) radio, Bluetooth, ZigBee, and/or a wireless network radio, such as a radio capable of communication with a wireless communication network such as a Long Term Evolution (LTE) network, WiMAX network, 3G network, etc.

The content selection server(s) 600 may further include one or more network interface(s) 608 via which the content selection server(s) 600 may communicate with any of a variety of other systems, platforms, networks, devices, and so forth. The network interface(s) 608 may enable communication, for example, with one or more wireless routers, one or more host servers, one or more web servers, and the like via one or more of networks.

The antenna(e) 634 may include any suitable type of antenna depending, for example, on the communications protocols used to transmit or receive signals via the antenna (e) 634. Non-limiting examples of suitable antennas may include directional antennas, non-directional antennas, dipole antennas, folded dipole antennas, patch antennas, multiple-input multiple-output (MIMO) antennas, or the like. The antenna(e) 634 may be communicatively coupled to one or more transceivers 612 or radio components to which or from which signals may be transmitted or received.

As previously described, the antenna(e) 634 may include a cellular antenna configured to transmit or receive signals in accordance with established standards and protocols, such as Global System for Mobile Communications (GSM), 3G standards (e.g., Universal Mobile Telecommunications System (UMTS), Wideband Code Division Multiple Access (W-CDMA), CDMA2000, etc.), 4G standards (e.g., Long-Term Evolution (LTE), WiMax, etc.), direct satellite communications, or the like.

The antenna(e) 634 may additionally, or alternatively, include a Wi-Fi antenna configured to transmit or receive signals in accordance with established standards and protocols, such as the IEEE 802.11 family of standards, including via 2.4 GHz channels (e.g., 802.11b, 802.11g, 802.11n), 5 GHz channels (e.g., 802.11n, 802.11ac), or 60 GHz channels (e.g., 802.11ad). In alternative example embodiments, the antenna(e) 634 may be configured to transmit or receive radio frequency signals within any suitable frequency range forming part of the unlicensed portion of the radio spectrum.

The antenna(e) 634 may additionally, or alternatively, include a GNSS antenna configured to receive GNSS signals from three or more GNSS satellites carrying time-position information to triangulate a position therefrom. Such a GNSS antenna may be configured to receive GNSS signals from any current or planned GNSS such as, for example, the Global Positioning System (GPS), the GLONASS System, the Compass Navigation System, the Galileo System, or the Indian Regional Navigational System.

The transceiver(s) 612 may include any suitable radio component(s) for—in cooperation with the antenna(e) 634—transmitting or receiving radio frequency (RF) signals in the bandwidth and/or channels corresponding to the communications protocols utilized by the content selection server(s) 600 to communicate with other devices. The transceiver(s) 612 may include hardware, software, and/or firmware for modulating, transmitting, or receiving—potentially in cooperation with any of antenna(e) 634—communications signals according to any of the communications protocols discussed above including, but not limited to, one or more Wi-Fi and/or Wi-Fi direct protocols, as standardized by the IEEE 802.11 standards, one or more non-Wi-Fi protocols, or one or more cellular communications protocols or standards. The transceiver(s) 612 may further include hardware, firmware, or software for receiving GNSS signals. The transceiver(s) 612 may include any known receiver and baseband suitable for communicating via the communications protocols utilized by the content selection server(s) 600. The transceiver(s) 612 may further include a low noise amplifier (LNA), additional signal amplifiers, an analog-to-digital (A/D) converter, one or more buffers, a digital baseband, or the like.

The sensor(s)/sensor interface(s) 610 may include or may be capable of interfacing with any suitable type of sensing device such as, for example, inertial sensors, force sensors, thermal sensors, and so forth. Example types of inertial sensors may include accelerometers (e.g., MEMS-based accelerometers), gyroscopes, and so forth.

The speaker(s) 614 may be any device configured to generate audible sound. The microphone(s) 616 may be any device configured to receive analog sound input or voice data.

It should be appreciated that the program module(s), applications, computer-executable instructions, code, or the like depicted in FIG. 6 as being stored in the data storage 620 are merely illustrative and not exhaustive and that processing described as being supported by any particular module may alternatively be distributed across multiple module(s) or performed by a different module. In addition, various program module(s), script(s), plug-in(s), Application Programming Interface(s) (API(s)), or any other suitable computer-executable code hosted locally on the content selection server(s) 600, and/or hosted on other computing device(s) accessible via one or more networks, may be provided to support functionality provided by the program module(s), applications, or computer-executable code depicted in FIG. 6 and/or additional or alternate functionality. Further, functionality may be modularized differently such that processing described as being supported collectively by the collection of program module(s) depicted in FIG. 6 may be performed by a fewer or greater number of module(s), or functionality described as being supported by any particular module may be supported, at least in part, by another module. In addition, program module(s) that support the functionality described herein may form part of one or more applications executable across any number of systems or devices in accordance with any suitable computing model such as, for example, a client-server model, a peer-to-peer model, and so forth. In addition, any of the functionality described as being supported by any of the program module(s) depicted in FIG. 6 may be implemented, at least partially, in hardware and/or firmware across any number of devices.

It should further be appreciated that the content selection server(s) 600 may include alternate and/or additional hardware, software, or firmware components beyond those described or depicted without departing from the scope of the disclosure. More particularly, it should be appreciated that software, firmware, or hardware components depicted as forming part of the content selection server(s) 600 are merely illustrative and that some components may not be present or additional components may be provided in various embodiments. While various illustrative program module(s) have been depicted and described as software module(s) stored in data storage 620, it should be appreciated that functionality described as being supported by the program module(s) may be enabled by any combination of hardware, software, and/or firmware. It should further be appreciated that each of the above-mentioned module(s) may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other module(s). Further, one or more depicted module(s) may not be present in certain embodiments, while in other embodiments, additional module(s) not depicted may be present and may support at least a portion of the described functionality and/or additional functionality. Moreover, while certain module(s) may be depicted and described as sub-module(s) of another module, in certain embodiments, such module(s) may be provided as independent module(s) or as sub-module(s) of other module(s).

One or more operations of the methods, process flows, and use cases of FIGS. 1-5 may be performed by a device having the illustrative configuration depicted in FIG. 6, or more specifically, by one or more engines, program module(s), applications, or the like executable on such a device. It should be appreciated, however, that such operations may be implemented in connection with numerous other device configurations.

The operations described and depicted in the illustrative methods and process flows of FIGS. 1-5 may be carried out or performed in any suitable order as desired in various example embodiments of the disclosure. Additionally, in certain example embodiments, at least a portion of the operations may be carried out in parallel. Furthermore, in certain example embodiments, less, more, or different operations than those depicted in FIGS. 1-5 may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Program module(s), applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in the flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in the flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program module(s), or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

That which is claimed is:

1. A method comprising:
receiving, by one or more computer processors coupled to at least one memory, a first bid request for a content delivery slot, wherein the first bid request comprises a first user identifier for a first user;
determining clickstream data for the first user using the first user identifier;
determining a first set of product identifiers that the first user interacted with using the clickstream data;
deduplicating the first set of product identifiers to remove duplicate product identifiers;
selecting a random subset of the first set of product identifiers, wherein the random subset comprises at most twenty product identifiers;
sending a first evaluation request comprising the random subset to a model evaluator component, wherein the model evaluator component is configured to determine an estimated value for one or more of the random subset, wherein the estimated value comprises a first bid amount for a first product identifier of the one or more of the random subset;
receiving a second bid request comprising a second user identifier for a second user;
determining that the second user interacted with one product identifier;
sending a second evaluation request comprising the one product identifier to the model evaluator component;
determining that a first timer for the for a first response to the first bid request;
determining, based on the model evaluator component, a first set of estimated values for the one or more of the random;
pausing determination of bid amounts for unevaluated product identifiers in the random set based on at least one of a timer value associated with the first timer, a number of unevaluated product identifiers associated with the first bid request, or a number of evaluated product identifiers associated with the first bid request;
determining, during the pausing, an estimated value for the one product identifier;
determining, after the pausing, an estimated value for at least one of unevaluated product identifiers in the random subset;
selecting a highest ranked product identifier from the first set of estimated values and the estimated value for the at least one of unevaluated product identifiers using respective estimated values;
sending the first response to the first bid request using the highest ranked product identifier; and
sending a second response to the second bid request using the estimated value for the one product identifier.

2. The method of claim 1, further comprising:
determining a second set of product identifiers that are related to one or more of the first set of product identifiers, wherein the random subset further comprises product identifiers from the second set;
determining that the highest ranked product identifier is associated with a promotional offer; and
using the promotional offer in the first response to the first bid request;
wherein the model evaluator component is configured to prioritize product identifiers in the random subset that are associated with promotional offers.

3. The method of claim 1, further comprising:
determining an allotted time for responding to the first bid request; and
generating the first timer, wherein the first timer is for a length of time that is less than the allotted time;
wherein the first timer is accessible by the model evaluator component.

4. The method of claim 1, wherein pausing the determination of bid amounts for the unevaluated product identifiers in the random set comprises:

determining that a first total number of product identifiers for the first evaluation request is greater than a second total number of product identifiers for the second evaluation request;
determining a first estimated value for a first product identifier of the first evaluation request;
determining that a remaining amount of time on a second timer for a second response to the second bid request is less than a threshold value; and
pausing evaluation of the first evaluation request.

5. A method comprising:
determining, by one or more computer processors coupled to at least one memory, a first bid request comprising a first user identifier;
determining a first timer for a first response to the first bid request;
determining a first set of product identifiers in a first user interaction history of the first user identifier;
determining a second bid request comprising a second user identifier;
determining a second set of product identifiers in a second user interaction history of the second user identifier;
determining estimated values for a portion of the first set of product identifiers, wherein the estimated values comprise a first bid amount for a first product identifier of the portion;
pausing determination of bid amounts for unevaluated product identifiers in the first set of product identifiers based on at least one of a timer value associated with the first timer, a number of unevaluated product identifiers associated with the first bid request, or a number of evaluated product identifiers associated with the first bid request;
determining, during the pausing, estimated values for one or more product identifiers in the second set of product identifiers;
determining, after the pausing, an estimated value for at least one of unevaluated product identifiers in the first set of product identifiers; and
generating respective first and second responses to the first bid request and the second bid request using the estimated values.

6. The method of claim 5, further comprising: determining that the first timer is expired.

7. The method of claim 5, further comprising:
determining a second timer for a second response to the second bid request;
determining that the second timer is at or below a threshold length of time; and
determining at least one estimated value for the second set of product identifiers.

8. The method of claim 5, further comprising:
determining a set of related product identifiers, wherein the set of related product identifiers comprises product identifiers related to at least one product identifier of the first set of product identifiers; and
determining, after the pausing, estimated values for the set of related product identifiers.

9. The method of claim 5, further comprising:
determining a first subset of the first set of product identifiers, wherein the first subset is randomly selected;
determining a second subset of the second set of product identifiers, wherein the second subset is randomly selected;
determining a first highest ranked product identifier for the first bid request using the estimated values; and
determining a second highest ranked product identifier for the second bid request using the estimated values;
wherein the respective first response and second response comprise the first highest ranked product identifier or the second highest ranked product identifier.

10. The method of claim 5, wherein one estimated value for a product identifier in the first set of product identifiers is determined before two estimated values for two product identifiers in the second set of product identifiers are determined.

11. The method of claim 5, further comprising:
selecting a product identifier for the first response using the estimated values; and
determining that the product identifier is associated with a promotional offer.

12. The method of claim 5, further comprising:
determining a product identifier for the first response using the estimated values;
determining an expected profit from a purchase of the product identifier; and
modifying a bid amount for the product identifier using the expected profit.

13. The method of claim 5, further comprising determining that the second bid request was received at a peak bid request processing time.

14. The method of claim 5, further comprising:
determining a product identifier for the first response using the estimated values; and
determining a contribution profit value for the product identifier.

15. The method of claim 5, wherein pausing the determination of bid amounts for the unevaluated product identifiers in the first set of product identifiers comprises:
determining that a first total number of product identifiers for the first bid request is greater than a second total number of product identifiers for the second bid request;
determining a first estimated value for a first product identifier of the first bid request;
determining that a remaining amount of time on a second timer for a second response to the second bid request is less than a threshold value; and
pausing determination of estimated values for the first bid request while determining estimated values for the second bid request.

16. A device comprising:
at least one memory that stores computer-executable instructions; and
at least one processor configured to access the at least one memory and execute the computer-executable instructions to:
determine a first bid request comprising a first user identifier;
determine a first timer for a first response to the first bid request;
determine a first set of product identifiers in a first user interaction history of the first user identifier;
determine a second bid request comprising a second user identifier;
determine a second set of product identifiers in a second user interaction history of the second user identifier;
determine estimated values for a portion of the first set of product identifiers, wherein the estimated values comprise a first bid amount for a first product identifier of the portion;

paus determination of bid amounts for unevaluated product identifiers in the first set of product identifiers based on at least one of a timer value associated with the first timer, a number of unevaluated product identifiers associated with the first bid request, or a number of evaluated product identifiers associated with the first bid request;

determine estimated values for one or more product identifiers the second set of product identifiers;

determine, after the pausing, an estimated value for at least one of unevaluated product identifiers in the first set of product identifiers; and generate respective responses to the first bid request and the second bid request using the estimated values.

17. The device of claim 16, wherein the at least one processor is further configured to access the at least one memory and execute the computer-executable instructions to: determine that the first timer is expired.

18. The device of claim 16, wherein the at least one processor is further configured to access the at least one memory and execute the computer-executable instructions to:

determine a second timer for a second response to the second bid request;

determine that the second timer is at or below a threshold length of time; and determine that at least one estimated value has been determined for the second set of product identifiers.

19. The device of claim 16, wherein the at least one processor is further configured to access the at least one memory and execute the computer-executable instructions to:

determine a set of related product identifiers, wherein the set of related product identifiers comprises product identifiers related to at least one product identifier of the first set of product identifiers; and determine estimated values for one or more product identifiers in the set of related product identifiers.

20. The device of claim 16, wherein the at least one processor is further configured to access the at least one memory and execute the computer-executable instructions to:

determine a first subset of the first set of product identifiers, wherein the first subset is randomly selected;

determine a second subset of the second set of product identifiers, wherein the second subset is randomly selected;

determine a first highest ranked product identifier for the first bid request using the estimated values; and determine a second highest ranked product identifier for the second bid request using the estimated values;

wherein the respective responses comprise the first highest ranked product identifier or the second highest ranked product identifier.

* * * * *